United States Patent
Hagentoft (10) Patent No.: US 7,758,408 B2
(45) Date of Patent: Jul. 20, 2010

(54) DEHUMIDIFYING VENTILATION AND REGULATION OF AIRFLOW IN ENCLOSED STRUCTURES

(75) Inventor: Carl-Eric Hagentoft, Gothenburg (SE)

(73) Assignee: Ventotech AB, Gothenburg (SE)

( * ) Notice: Subject to any disclaimer, the term of this patent is extended or adjusted under 35 U.S.C. 154(b) by 325 days.

(21) Appl. No.: 11/807,799

(22) Filed: May 30, 2007

(65) Prior Publication Data

US 2008/0041970 A1    Feb. 21, 2008

Related U.S. Application Data

(60) Provisional application No. 60/810,071, filed on Jun. 1, 2006.

(51) Int. Cl.
*F24F 7/00* (2006.01)
*F24F 11/00* (2006.01)
*G05D 22/02* (2006.01)

(52) U.S. Cl. .................. 454/256; 454/239; 236/44 A; 236/44 C (58) Field of Classification Search .......... 454/239, 454/253, 256; 236/44 A, 44 C
See application file for complete search history.

(56) References Cited

U.S. PATENT DOCUMENTS

| | | | | |
|---|---|---|---|---|
| 2,733,649 | A * | 2/1956 | LeBarron | 454/239 |
| 5,082,173 | A * | 1/1992 | Poehlman et al. | 236/11 |
| 5,364,026 | A * | 11/1994 | Kundert | 236/49.3 |
| 5,675,979 | A * | 10/1997 | Shah | 62/176.6 |
| 5,881,951 | A * | 3/1999 | Carpenter | 236/44 A |
| 6,052,998 | A * | 4/2000 | Dage et al. | 62/89 |
| 6,145,750 | A * | 11/2000 | Carpenter | 236/44 A |
| 6,161,763 | A * | 12/2000 | Reuter | 236/44 C |
| 6,786,220 | B2 * | 9/2004 | Bokelman et al. | 131/300 |
| 6,826,920 | B2 * | 12/2004 | Wacker | 62/176.6 |
| 2003/0084638 | A1 * | 5/2003 | Vacek | 52/741.3 |
| 2004/0144849 | A1 * | 7/2004 | Ahmed | 236/1 E |
| 2005/0087612 | A1 * | 4/2005 | Fuller | 236/44 A |
| 2007/0205294 | A1 * | 9/2007 | Byczynski et al. | 236/44 C |

OTHER PUBLICATIONS

Vrána T, Björk F. A laboratory equipment for the study of moisture processes in thermal insulation materials when placed in a temperature field. Constr Build Mater 2008;22:2335-44 (citing C.E. Hagentoft, Introduction to building physics, Studentlitteratur, Lund (2001) p. 87-149).*

* cited by examiner

*Primary Examiner*—Steven B McAllister
*Assistant Examiner*—Patrick F. O'Reilly, III
(74) *Attorney, Agent, or Firm*—Lynn E. Barber (57) ABSTRACT

A system and method for regulating humidity in an enclosed structure, including an outside humidity sensor; an outside temperature sensor; an inside humidity sensor; an inside temperature sensor; a ventilation system; and a computing unit that receives sensor information from the temperature and humidity sensors, compares sensor information from inside and outside the enclosed structure, and utilizes the comparison of sensor information to generate one or more output signals to control the ventilation system. This ensures that supply ventilation (by outdoor air) is activated only when it is beneficial for the drying of the attic and controls the ventilation so that an acceptable moisture level is ensured with a minimal ventilation rate, resulting in a warmer attic and reduced heat loss during the heating season.

17 Claims, 5 Drawing Sheets

DEHUMIDIFYING VENTILATION AND REGULATION OF AIRFLOW IN ENCLOSED STRUCTURES

CROSS-REFERENCE TO RELATED APPLICATIONS

This application claims priority from U.S. Provisional Application Ser. No. 60/810,071 filed Jun. 1, 2006, which is incorporated herein by reference.

BACKGROUND OF THE INVENTION

Field of the Invention

The present invention generally relates to moisture problems in enclosed or semi-enclosed structures in dwellings or other similar structures. In order to design moisture safe structures it is important to eliminate or minimize moisture sources. The main sources are to be controlled for roof and attic constructions, namely; precipitation, building damp (moisture stored in building material initially which will dry out with time), and indoor and outdoor air humidity. It is obvious that rain that falls on the roof or thawing snow and ice should not enter the attic. Building damp must be eliminated during the construction period or by adequate ventilation during the drying out period. Indoor air should be prevented from flowing up into the attic. A perfect airtight attic floor construction eliminates this airflow. It can also be solved by creating a positive air pressure in the attic in relation to the space below the attic floor, either by creating a positive pressure in the attic space or by a negative pressure in the space below or by combinations of these two measures.

The outdoor air that enters the attic also carries moisture (water vapor). This air has a capacity to dry out moisture if the humidity levels are higher in the attic space than in the outdoor air. Alternatively, the outdoor air can also release some of its moisture if the humidity levels are lower in the attic space. There is a hygroscopic moisture uptake in building materials and/or moisture can condense on surfaces in the attic. Typically, this is the case when attics are colder than the surrounding air. This can be physically explained for example by long wave radiation to the sky during night periods and minimized heat flow through the attic floors of thermally well insulated structures. Traditionally, enhanced ventilation has always been considered beneficial. One of the first capacious field investigations on cold attics focused on ventilation airflow rate and moisture buffering capacity of the insulating material of the attic floor (Samuelson, 1995, Temperatures and relative humidities in ventilated and unventilated attics. Measurements and calculations in attics with loose fill insulation of mineral wool and cellulose fibre. SP report 1995:68, Swedish National Testing and Research Institute, Sweden). The investigation showed that the more ventilated the attic is, the higher relative humidity is reached. This conclusion is valid only under the condition that there is no moisture load from inside the dwelling.

The problems with moisture often occur when the insulation to the indoor space is improved resulting in a cooler attic. Other examples are a changed method of heating the dwelling. Although it is more than 30 years since moisture problems in attics have become widespread, we still face the appearance of mold growth on internal wooden roof sides.

In an ongoing discussion in the U.S., traditional ventilation of attics is questioned. While attic ventilation can be beneficial under some circumstances and climates, it should not be seen as the principal strategy to eliminate moisture and other problems in attics and rooms. Touted benefits of attic ventilation include reducing moisture problems, minimizing of ice dams, ensuring shingle service life and reducing cooling load. Most building codes require attic ventilation to minimize condensation on the underside of roof sheathing. Attic ventilation is firmly established as an important element in residential roof construction, and lack of ventilation is routinely blamed for a variety of problems and failures. (TenWolde, Rose, 1999, 2002).

Guidelines given by the American Society of Heating, Refrigerating and Air-Conditioning Engineers (ASHRAE) (TenWolde, Rose, 1999, Issues related to venting of attics and cathedral ceilings, ASHRAE Transactions 1999, V. 105 and Rose, TenWolde, 2002, Issues related to venting of attics and cathedral ceilings, ASHRAE Journal October 2002) specify that:

Indoor humidity control should be the primary means to limit moisture accumulation in attics in cold and mixed climates. While they recommend attic ventilation as an additional safeguard, they do not believe it should be a regulated practice.

To minimize the danger of ice dam formation, heat sources in the attic and warm air leakage into the attic from below should be minimized. The need for venting to avoid icing depends on the climate and the amount of insulation in the ceiling. However, ventilation is necessary in climates with a lot of snow to prevent icing at eaves, regardless of insulation level.

Venting of attics and cathedral ceilings in cold and mixed climates is recommended. However, if there are strong reasons why attic vents are undesirable, unvented roofs can perform well in cold and mixed climates if measures are taken to control indoor humidity, to minimize heat sources in the attic, and to minimize air leakage into the attic from below. However, ventilation is necessary in climates with a lot of snow to prevent icing.

Ventilation should be treated as a design option in cold, wet coastal climates and hot climates. Current technical information does not support a universal requirement for ventilation of attics or cathedral ceilings in these climates.

TenWolde and Rose explain that sometimes adding attic vents may be impractical or undesirable. In addition, roof vents may have a role in fires in residential areas, allowing sparks to escape into the roof cavity and accelerating the spread of the fire due to draft in the ventilated space.

U.S. building codes, including the H.U.D. code (Department of Housing and Urban Development), require attic insulation in most cases for all climates. The primary aim of the current code's requirements for ventilating attics is to prevent condensation from occurring on the undersides of the roof sheeting. Cooling of attic air during the summer and possible extension of bitumen based roofing products' service lives also are named as additional benefits of attic ventilation. An additional problem is that insects may easier enter an unsealed attic.

In ASHRAE's (American Society of Heating, Refrigerating and Air-Conditioning Engineers) 1997 *Fundamentals Handbook*, several disadvantages of providing attic ventilation are cited. For example, cold air that is vented into attics during winter can degrade attic insulation's thermal performance. Also, in warm, humid climates, venting tends to increase an attic's moisture and humidity levels.

ASHRAE indicates the advantages and disadvantages of providing attic ventilation need to be evaluated on a case-by-case basis. For heating climates (cool climates), ASHRAE states the benefits typically outweigh the drawbacks; therefore, attic ventilation should be provided. For cooling climates (warm, humid climates), ASHRAE indicates the net benefits of venting do not always clearly outweigh the disadvantages; therefore, venting should not be required and should be considered a design option.

In the U.K. there is an attention on attic moisture problems. High air relative humidities in the loft cause the hygroscopic rafters to absorb water vapor, until the timber moisture content becomes high enough to promote rot. Cooling of the tiles by radiative heat loss overnight cools the underlay below the dewpoint of the air in the loft so that condensation forms on the underlay.

Building regulations in the U.K. require that the performance of building structures and the health of the occupants not be adversely affected by surface or interstitial condensation. The requirements are implemented by reference to the relevant parts of BS5250:2002, the British Standard Code of Practice for the Control of Condensation in Buildings, which in turn refers to the calculation procedure BS EN ISO 13788: 2001. However, structures with airflows through cracks and cavities are excluded. As airflows dominate the movement of moisture in ventilated attics, assessments of condensation risk using this procedure are not valid.

Published statements in the Swedish press argue that moisture-laden indoor air is the second leading cause of attic moisture (rain leakage is first). Since Swedish homes are built especially tight, due to the cold winter climate and interest in conserving energy, their attics remain very cold, and any moisture that finds its way into the attic is likely to condense, which can ultimately lead to problems such as rotting of wooden structures, molds etc. The condensate freezes and accumulates. Ceilings are actually known to collapse under this weight.

Samuelson (cited above) tested two new designs aimed at controlling attic moisture, and found both slightly effective. The first design included a thin layer of rigid foam insulation applied underneath roof sheathing. In the second design, similar insulation was applied to the roof and attic ventilation was also eliminated. Samuelson warns, however, that eliminating attic ventilation poses risks.

Swedish building recommendations (very often performance based) do not advise more than what this example from the Swedish building code (Building Regulations, BBR, 2002, section 6:5332) shows: "Attics, roof construction, attic floor constructions, installations and constructions placed in the attic should be built in such a way to prevent the occurrence of moisture damages."

Practice today focuses on adequate ventilation rate and ensuring airtight attic floor, including measures such as: using an airtight vapor barrier and caulk penetrations for building services.

Available technical solutions for ventilation today are based on natural ventilation with fixed openings at the ridge and/or the eaves. The trend today is to decrease the area of ventilation openings. This reduces the moisture source of the outdoor air. However, it is fatal if building damp is available or the attic floor is not sufficiently airtight. If one of these moisture sources is present, there is not sufficient ventilation that can evacuate the moisture. This will result in steady high humidity rates inside the attic construction.

A regular supply of ventilation to the attic, using a fan creates a stable air flow into the attic space, while at the same time creating a positive pressure in relation to the space underneath. This might, however, increase the moisture source of the outdoor air.

Exhaust ventilation in the space below the attic can eliminate the air leakages of indoor air. However, it does not reduce the moisture source of the outdoor air.

In other types of available technologies, methods are based on enhancing the drying of the attic space either by using diffusion open membranes or by mechanical dryers, instead of eliminating or reducing the moisture sources. The technology with diffusion open membranes is basically only applicable for new buildings and it can be questioned how well it works in cases of moisture damp and/or buildings that are not airtight. Mechanical dryers in combination with sealing of the ventilation openings can work, but is an expensive solution. Due to the very low temperature (below zero degrees Celsius) in attics during the winter period, only sorption dryers can operate. A regular control and maintenance must also be kept.

Other examples of how ventilation of enclosed structures is regulated are described in U.S. Pat. Nos. 5,881,951 and 6,145, 750. These solutions regulate moisture beneath enclosed structures such as in crawlspaces of dwellings. These inventions ventilate an enclosed structure with respect to the inside and outside humidity but the crawlspace in those patents is ventilated by an fan to exhaust the moisture whereas the disclosed invention creates a positive air pressure through an active supply of air from the outside.

Other related solutions are pure drying processes for wet buildings such as in U.S. Pat. No. 6,161,763. This invention creates an air circulation in a wet (i.e. flooded) building given the absolute humidity at the wet position and the surrounding humidity and temperature. Still, the solution focuses on a wet or water-damaged part of a building and not on the level of moisture in a space. Furthermore, this solution does not consider the air pressure in an enclosed structure.

It is therefore an object of the invention to provide a system and method for controlling ventilation and airflow in enclosed structures to regulate moisture. Thus, for a given attic structure, whether or not it is airtight in the floor or has building damp, an adapted intelligent ventilation strategy is crucial to ensure moisture safety. This is solved by the invention described herein. The invention is based on a concept of controlled ventilation. The effect of the invention is related to the level of the sealing of the attic i.e. the more airtight towards the exterior the better effect of the invention. This means, that for an existing building all openings at the eaves and at the ridge are sealed as well as possible. The invention ensures that supply ventilation (by outdoor air) is activated only when it is beneficial for the drying of the attic.

The sealing of the attic reduces air flow upwards through the attic floor when the ventilation is off and the created positive pressure eliminates it during on-periods. During periods with drying of building damp, the ventilation control unit ensures that the ventilation is activated only when this is beneficial compared to the moisture and temperature conditions of the outside air. After the drying period the ventilation rate of the attic is automatically reduced.

The invention controls the ventilation so that an acceptable moisture level is ensured with a minimal ventilation rate, which results in a warmer attic and reduced heat loss during the heating season.

In warm and humid climates there is a need of cooling, i.e. a reduction of heat gains to the dwelling. This can be accomplished by an enhanced ventilation of the attic. By using the invention, the attic ventilation can be controlled and switched on during periods when the exterior air is drier than the attic air, and thereby not compromising the moisture safety of the attic.

SUMMARY OF THE INVENTION

The invention is based on a concept of controlled ventilation. The effect of the invention is related to the level of the sealing of the attic so that the more airtight towards the exterior the better effect of the invention. This means that for an existing building all openings at the eaves and at the ridge are sealed as well as possible. The invention ensures that supply ventilation (by outdoor air) is activated only when it is beneficial for the drying of the attic. The invention controls the ventilation so that an acceptable moisture level is ensured with a minimal ventilation rate, which results in a warmer attic and reduced heat loss during the heating season.

The invention herein makes it possible to increase the attic floor insulation and thereby reduce heat loss, without compromising the safety against moisture problems of the attic structure. The invention works most efficiently when the attic is sealed. Additional benefits of this are reduced cost since it is not necessary to install vents, diminished risk for fire (sparks entering the attic through the vents in case of for instance a forest fire), and efficient locking out of pests.

The invention can be applied also on other enclosed structures such as houses that are only used occasionally, basements, boats, caravans, freight-containers and the like, where moisture may be a problem. The invention herein reduces the level of moisture in the selected space enabling a lower heating of the area and thereby also the cost of energy.

Other objects and advantages will be more fully apparent from the following disclosure and appended claims.

DETAILED DESCRIPTION OF THE INVENTION AND PREFERRED EMBODIMENTS THEREOF

Briefly, the invention herein is based on a concept of controlled ventilation in which the effect of the invention is related to the level of the sealing of the attic or other enclosed space so that the more the space is airtight towards the exterior, the better effect of the invention. This means that for an existing building all openings at the eaves and at the ridge are sealed as well as possible. Supply ventilation (by outdoor air) is activated only when it is beneficial for the drying of the attic. The invention controls the ventilation so that an acceptable moisture level is ensured with a minimal ventilation rate, which results in a warmer attic and reduced heat loss during the heating season.

Figure 1:
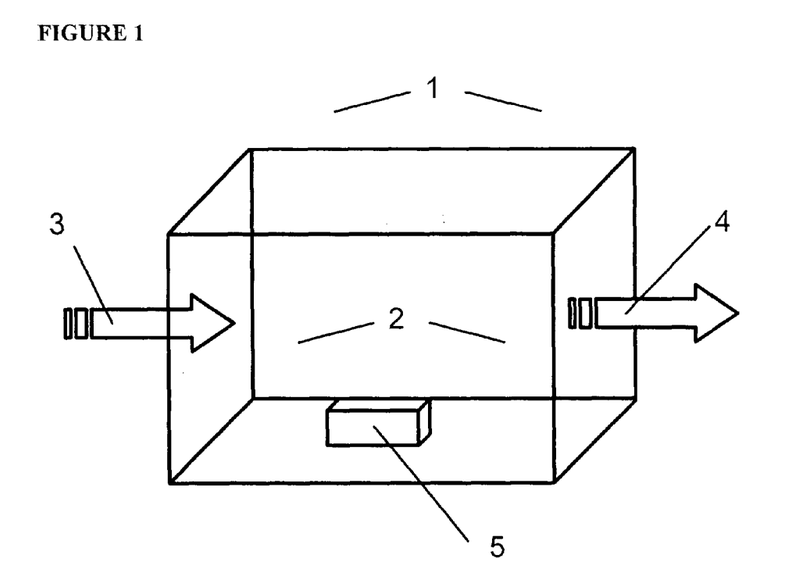
FIG. 1 is a schematic drawing of the general concept of the invention.

Referring now to the figures, as shown in FIG. 1, in the invention herein air outside (1) of an enclosed or semi-enclosed space communicates with the inner air (2). When the air outside (1) has a lower water vapor pressure than the inner air (2), air from the outside will be ventilated (3) into the space. When the inside air (2) has a lower water vapor pressure than the outside air (1) there is no ventilation (3) into the space. Air from the inside (2) can be let out to the outside (1) by a ventilation opening (4) when the ventilation (3) is active. Regulation of the ventilation (3,4) is done mechanically or by a central computing system (5).

Figure 2:
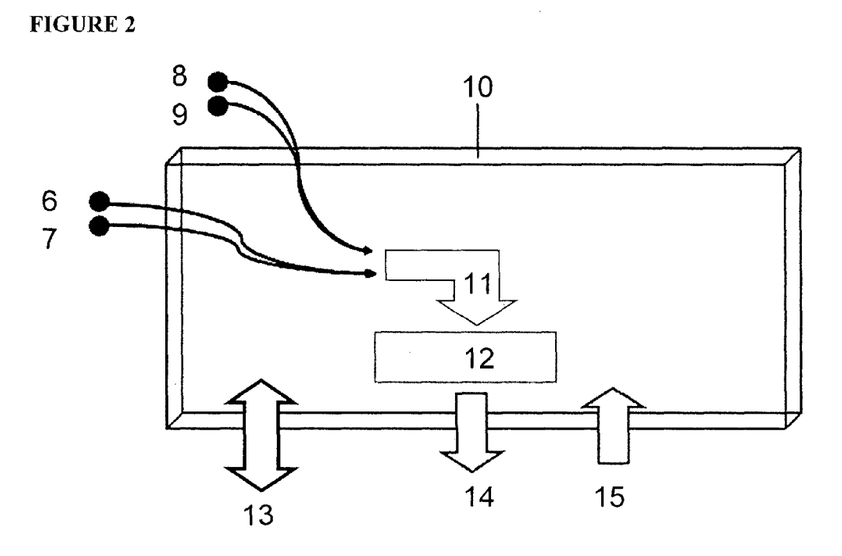
FIG. 2 is a schematic drawing that shows the general concept of the technical solution provided by the invention.

In FIG. 2, showing the technical solution provided by the invention, an outside humidity sensor (6) combined with an outside temperature sensor (7) adjusted to external climate, one or more inside humidity sensors (8) combined with one or more inside temperature sensors (9) gives input data to a computing unit (10). An algorithm (11) compares sensor information and other determining factors to generate one or more output signals which control one or more relays and/or rev-regulators (12), which in turn control (14) one or more electrical components. The system is driven by electricity (15) provided either through grid power or battery. The input signals from the sensors (6-9) and output signals (14) can either be transferred wireless or through cables to the computing unit (10). The system can be monitored and or regulated by wired or wireless communication devices (13).

Figure 3:
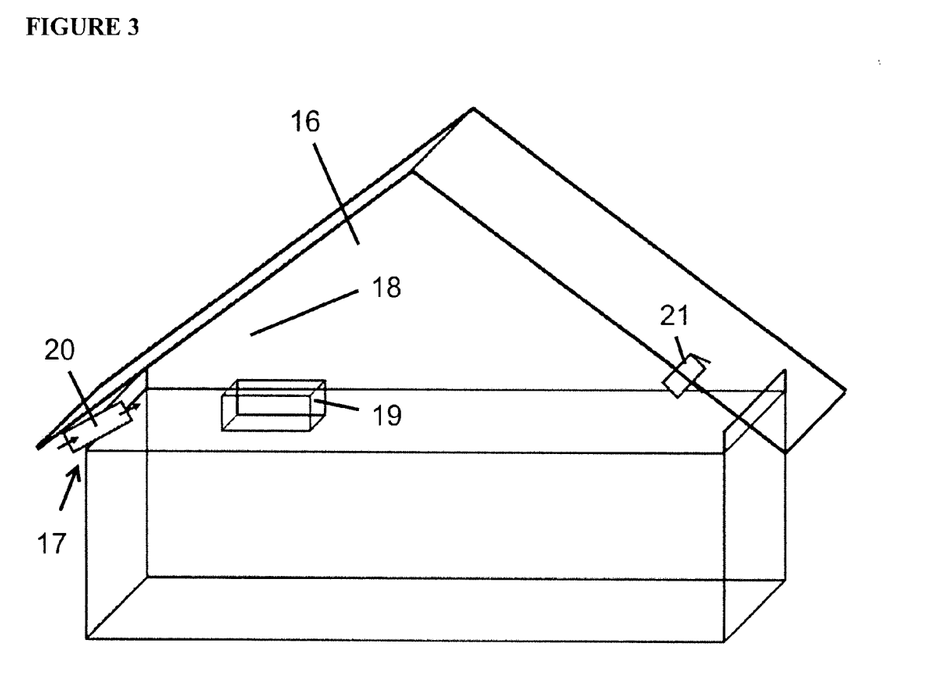
FIG. 3 shows the basic embodiment of the invention applied on an attic of a dwelling.

In FIG. 3, showing the basic embodiment of the invention applied on an attic of a dwelling, an enclosed or semi enclosed space (16) forms an inside and an outside setting. Sensors (17) placed outside the structure sense the external humidity and temperature and sensors placed inside the structure (18) sense the inside humidity and temperature. The sensors can be connected to a computing unit (19) either through wire or wireless. A ventilation unit (20) that can be a fan, damper or any other type of ventilation system receives the output signal from the computing unit (19) either through wire or wireless. A ventilation opening (21) is mounted somewhere in the enclosed space, in order to let the air out when a positive air pressure is created by the supply of air from the ventilation unit (20).

Figure 4:
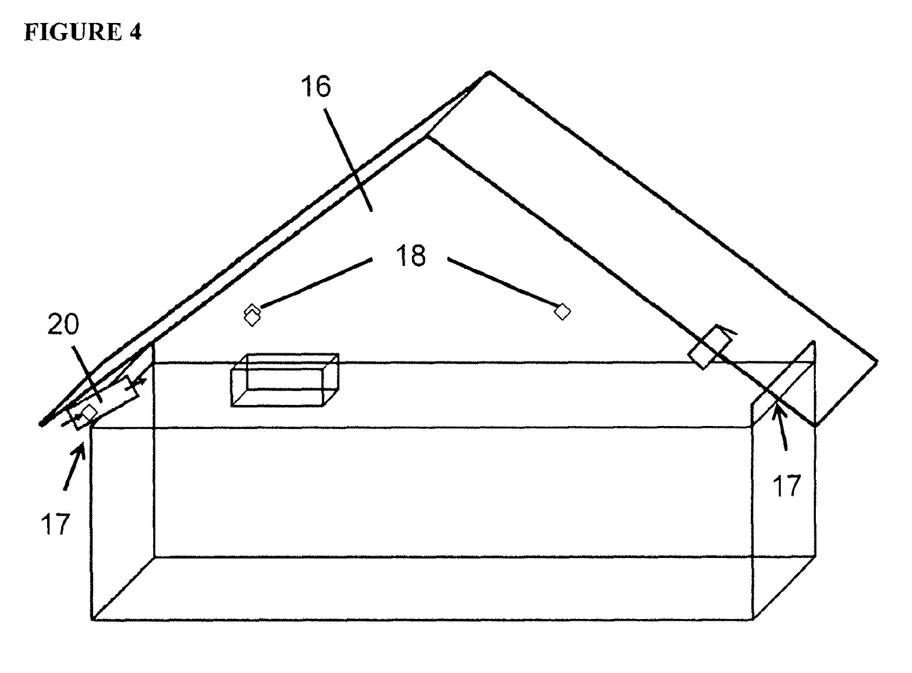
FIG. 4 shows the basic embodiment of the invention applied on an attic of a dwelling when the water vapor pressure is measured on several places in space.

When water vapor pressure is measured on several places in the space, sensors (18) are placed at two or more places inside the attic or the semi-enclosed attic (16) (FIG. 4). Sensors are placed outside the attic (17) next to the ventilation unit (20) or at other places outside the structure.

Figure 5:
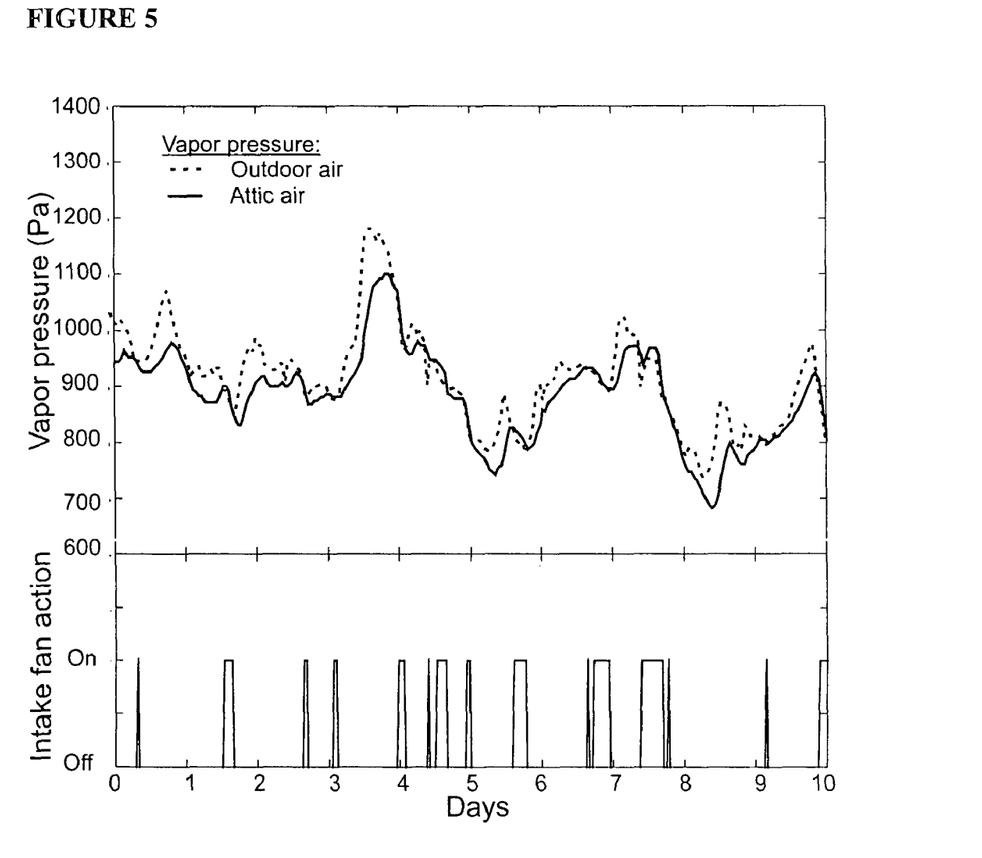
FIG. 5 shows an example of vapor pressure results obtained with the invention during a 10 day period.

Vapor pressure results obtained with the invention during a 10 day period are shown in FIG. 5. The intake fan is activated when the water vapor pressure of the inside air is higher than the water vapor pressure of the outside air. Correspondingly, the fan is stopped and the ventilation is shut when the water vapor pressure is lower on the inside than on the outside.

Figure 6:
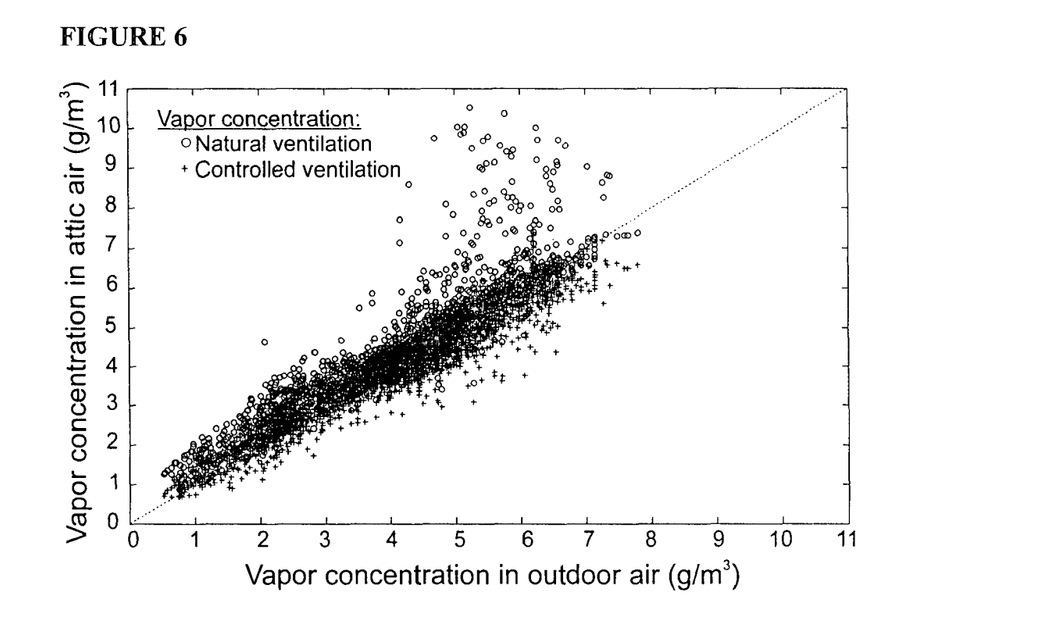
FIG. 6 shows a comparison in water vapor concentration (g/m$^3$) between the inside (attic) and outside air for natural ventilation and ventilation controlled by the invention.

FIG. 6 is a comparison in water vapor concentration (g/m$^3$) between the inside (attic) and outside air for natural ventilation and ventilation controlled by the invention. Dots above the diagonal line signifies a state of higher humidity on the inside (attic) than on the outside. Dots below the diagonal signifies a drier climate on the inside. With natural ventilation, the region above the diagonal dominates. This indicates that the inside (attic) air consists of outside air with an additional moisture gain from building damp or air-flow through the attic floor. With the controlled ventilation, the inside (attic) air is kept in a drier state than the outside air.

Figure 7:
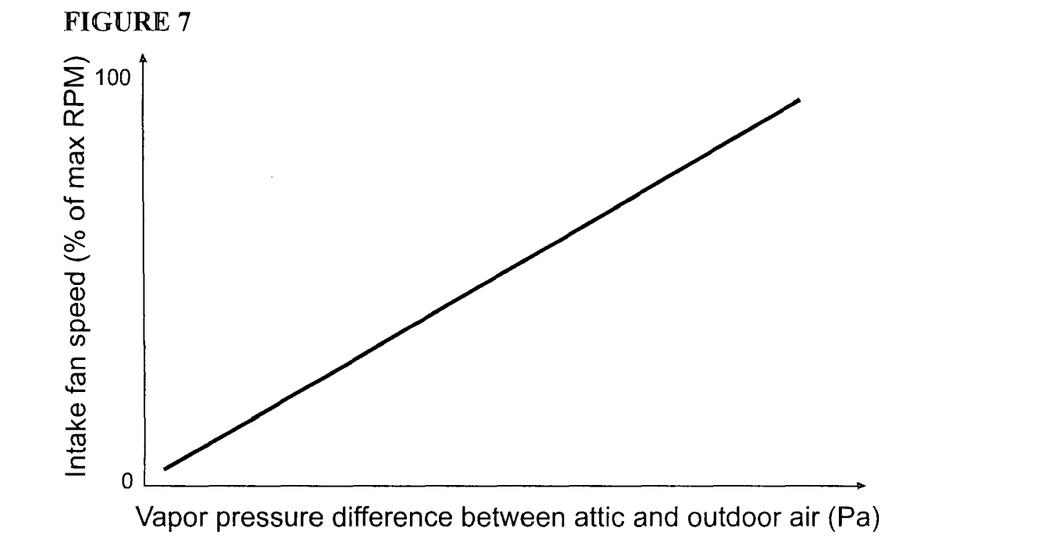
FIG. 7 shows the level of speed for when a rev-controlled intake fan is used in the invention.

FIG. 7 shows the level of speed for when a rev-controlled intake fan is used in the invention. The fan speed is in this example directly proportional to the difference in vapor pressure between the attic and outdoor air.

Thus, in the invention herein, the forced ventilation of the attic of a normal family house is activated when it is beneficial for the drying of the space. By systematically switching the ventilation on and off, the humidity levels are reduced or kept at levels not harmful for the structures. In this way deterioration of materials and biological growth can be controlled or eliminated.

The technology is based on the following general concept, which in its preferred embodiment is related to attic space:

Airtight space (as good as possible, a perfectly airtight space is normally not possible to achieve) of the attic space is provided towards the exterior and the interior below the attic space A controlled supply fan or ventilation opening Ventilation damper to eliminate unintentional ventilation during periods when the ventilation should be off Sensors as known in the art One or more for relative humidity and one for temperature inside the space One or more for relative humidity and one for temperature outside the space (exterior)

Alternatively two or more sensors for the water vapor partial pressure, one inside and one outside the space One regulation system requiring electricity as known in the art Supplementary, a user interface, comprising display and/or Internet connection, can be added The method is based on:

A continuous flow of measured values of moisture conditions and temperature of the air inside and outside the space.

A calculated floating average of the water vapor pressure, based on measured relative values of humidity and temperature, typically over a time period in the range of 10-15 minutes.

Alternatively the regulation is based on sampled data with a time interval in the range of 10-15 minutes.

The supply ventilation is switched on or kept on if the partial water vapor pressure is higher in the space than in the outside air.

The supply ventilation can be regulated dependent on the level of difference between inside and outside water vapor pressure and/or temperature.

The supply ventilation is switched off or kept off if the partial water vapor pressure is lower in the space than in the outside air.

The calculated partial water vapor pressure is based on measured relative humidity (RH) and temperature (T). The parameter X, which is the ratio between the water vapor pressure of the air in the space (interior) and outside air (exterior), determines the operation of the fan:

If X>1 the supply fan should be on

If X<=1 the supply fan should be off

An approximate formula can be used for the calculation of X. In the formula, below, the constants a, b and n are used. They depend on temperature. The index i and e refer to the (interior) temperature of the ventilated space or the exterior temperature (outside).

$$X = \frac{RH_i \cdot a_i(b_i + T_i/100)^{n_i}}{RH_e \cdot a_e(b_e + T_e/100)^{n_e}},$$

$0 \leq T \leq 30 \; a = 288.68 \, Pa \; b = 1.098 \, n = 8.02$ $-20 \leq T \leq 0 \; a = 4.689 \, Pa \; b = 1.486 \, n = 12.3$ (T in degrees Celsius)

Moisture control of attics is one important application of the technology. In that case the fan is mounted somewhere in the attic external envelope, i.e. a place where the envelope can be penetrated by a supplying duct connecting the outdoor air with the air inside the attic. Two sensors are mounted inside the attic, not too close to the supply fan. Two sensors are mounted on the outside, protected from interaction with direct solar radiation and precipitation. The sensors should also have a minimized view of the sky to reduce cooling by long wave sky radiation.

While the invention has been described with reference to specific embodiments, it will be appreciated that numerous variations, modifications, and embodiments are possible, and accordingly, all such variations, modifications, and embodiments are to be regarded as being within the spirit and scope of the invention.

What is claimed is:

1. A system for minimizing humidity in an enclosed structure, comprising:
    a) an outside humidity sensor for sensing relative humidity outside the enclosed structure;
    b) an outside temperature sensor;
    c) an inside humidity sensor for sensing relative humidity in the enclosed structure;
    d) an inside temperature sensor for sensing temperature in the enclosed structure;
    e) a ventilation system comprising at least one of a fan and a damper; and
    f) a computing unit that receives sensor information from the inside and outside temperature and humidity sensors, calculates an inside water vapor pressure and an outside water vapor pressure from the sensor information from the inside and outside temperature and humidity sensors, compares the inside and outside water vapor pressures, and generates one or more output signals to regulate supply ventilation in the enclosed structure based upon the comparison, wherein the ventilation system is regulated based on a difference in water vapor pressure between the inside and the outside of the enclosed structure so that the ventilation system turns on by activating the fan or opening the damper whenever the inside water vapor pressure is higher than the outside water vapor pressure to create a positive air pressure in the enclosed structure, and wherein the ventilation system turns off by deactivating the fan or closing the damper whenever the water vapor pressure is lower on the inside of the enclosed structure than on the outside of the enclosed structure.

2. The system of claim 1, wherein the computing unit uses an algorithm to control the ventilation system, the algorithm comprising:

$$X = \frac{RH_i \cdot a_i(b_i + T_i/100)^{n_i}}{RH_e \cdot a_e(b_e + T_e/100)^{n_e}},$$

$0 \leq T \leq 30 \; a = 288.68 \, Pa \; b = 1.098 \, n = 8.02$ $-20 \leq T \leq 0 \; a = 4.689 \, Pa \; b = 1.486 \, n = 12.3$ (T in degrees Celsius)

wherein a, b and n are constants that depend on temperature, RH is relative humidity, T is temperature, i is interior, e is exterior, and X is the ratio between the water vapor pressure of the air in the enclosed structure and the water vapour pressure of air outside the enclosed structure, wherein when X>1 the ventilation system is turned on, and when X≦1 the ventilation system is turned off.

3. The system of claim 1, further comprising a wireless transmission to transfer the sensor information to the computing unit.

4. The system of claim 1, further comprising cables to transfer the sensor information to the computing unit.

5. The system of claim 1, wherein the enclosed structure is selected from the group consisting of attics, houses that are used occasionally, boats, caravans, and freight-containers.

6. The system of claim 5, wherein the enclosed structure is an attic.

7. The system of claim 1, wherein the enclosed structure is adjacent a heated area in a dwelling.

8. The system of claim 1, wherein the ventilation system includes the fan for creating the positive air pressure in the enclosed structure.

9. The system of claim 1, wherein the enclosed structure is in a newly built house having high moisture in materials used to build the house.

10. The system of claim 1, wherein the enclosed structure comprises an attic, and the amount of ventilation is increased when the outside air is cooler than the inner air and the temperature in the attic is higher than normal dwelling temperature.

11. The system of claim 1, further comprising a user interface connected to the computing unit.

12. A method for regulating humidity in an enclosed structure, comprising assembling the elements of claim 1 to form a system for regulating humidity in an enclosed structure.

13. The method of claim 12, wherein the computing unit uses an algorithm to control the ventilation system, the algorithm comprising:

$$X = \frac{RH_i \cdot a_i (b_i + T_i/100)^{n_i}}{RH_e \cdot a_e (b_e + T_e/100)^{n_e}},$$

$0 \leq T \leq 30 \quad a = 288.68\,Pa \quad b = 1.098 \quad n = 8.02$ $-20 \leq T \leq 0 \quad a = 4.689\,Pa \quad b = 1.486 \quad n = 12.3$ (T in degrees Celsius)

wherein a, b and n are constants that depend on temperature, RH is relative humidity, T is temperature, i is interior, e is exterior, and X is the ratio between the water vapor pressure of the air in the enclosed structure and the water vapour pressure of air outside the enclosed structure, wherein when X>1 the ventilation system is turned on, and when X≦1 the ventilation system is turned off.

14. The method of claim 12, further comprising transferring the sensor information to the computing unit using wireless transmission.

15. The method of claim 12, further comprising transferring the sensor information through cables to the computing unit.

16. The method of claim 12, wherein the amount of ventilation is increased as the difference in water vapor pressure between the inside and the outside of the enclosed structure increases.

17. The method of claim 12, wherein the enclosed structure comprises an attic, and the amount of ventilation is increased when the outside air is cooler than the inner air and the temperature in the attic is higher than normal dwelling temperature.

* * * * *